United States Patent [19]

Sekiguchi et al.

[11] Patent Number: 4,611,036

[45] Date of Patent: Sep. 9, 1986

[54] EPOXY RESIN COMPOSITION

[75] Inventors: Hisashi Sekiguchi; Norio Kobayashi, both of Chiba; Hideo Ohgishi, Ichihara, all of Japan

[73] Assignee: Dainippon Ink and Chemicals, Inc., Tokyo, Japan

[21] Appl. No.: 679,648

[22] Filed: Dec. 10, 1984

[51] Int. Cl.$^4$ ............................................. C08G 59/20
[52] U.S. Cl. ............................ 525/481; 525/485; 525/486; 525/488
[58] Field of Search ............... 525/481, 485, 486, 488; 528/98

[56] References Cited

U.S. PATENT DOCUMENTS

| | | | |
|---|---|---|---|
| 2,521,911 | 9/1950 | Greenlee | 525/486 |
| 3,766,296 | 10/1973 | Kassner | 525/481 X |
| 4,080,401 | 3/1978 | Kassner | 525/488 X |
| 4,340,716 | 7/1982 | Hata et al. | 528/98 X |
| 4,368,299 | 1/1983 | Watanabe et al. | 525/486 X |
| 4,440,914 | 4/1984 | Helfand | 525/486 X |

*Primary Examiner*—Earl Nielsen
*Attorney, Agent, or Firm*—Sherman and Shalloway

[57] ABSTRACT

An epoxy resin composition having excellent handling properties, solvent resistance and heat resistance and particularly excellent low-temperature curability is provided which comprises (A) a polyfunctional epoxy resin having an epoxy equivalent of 160 to 2,000 obtained by reacting an epoxy resin having an epoxy equivalent of 100 to 800 with a molecular weight increasing agent containing 2.1 to 10 functional groups (phenolic hydroxyl groups) on an average per molecule and (B) a curing agent for the epoxy resin) as essential ingredients.

16 Claims, No Drawings

EPOXY RESIN COMPOSITION

This invention relates to a novel and useful epoxy resin composition. More specifically, it relates to a resin composition comprising as an essential resin component a polyfunctional epoxy resin obtained by using a specific molecular weight increasing agent.

The epoxy resin is one of the important industrial materials supporting the modern industry and is very useful in a wide range of applications, for example in paints, adhesives, electrical applications or civil engineering applications because it gives a composition having excellent properties including excellent adhesive properties, water resistance, chemical resistance, electrical insulating properties, heat resistance and dimensional stability.

Such an epoxy resin composition is generally composed of an epoxy resin prepared from a diphenol typified by bisphenol A and an epoxy group-introducing compound typified by epichlorohydrin and a curing agent typified by a polyamine compound, a phenolic resin or an acid anhydride as principal ingredients optionally in combination with a third substance typified by a pigment such as talc, and is used in many applications. Methods of curing these epoxy resins may be divided into those of the room temperature drying type by which the epoxy resins are dried and cured by simply leaving them to stand under natural conditions without the application of any external factor such as heating, and those of the oven drying type by which the drying and curing of the epoxy resins is promoted by applying physical or chemical means such as heat or pressure as external factors either singly or in combination.

With epoxy resins of the oven drying type, it is not so difficult, but rather relatively easy, to set up constant stable drying and curing conditions always irrespective of geographical or climatic differences by maintaining external physical factors under constant conditions. The oven drying type epoxy resins are desired to have low temperature curability becasuse energy saving or increased productivity can be achieved by reducing external physical factors such as heat.

With regard to the room temperature drying type epoxy resins, the natural conditions are directly the drying and curing conditions. Since many factors including the atmospheric temperature, humidity and the air current incessantly vary, it is difficult to control the drying and curing operation by man's power. In practice, there are many occasions when natural drying and curing is required, for example in coating, adhesion, electrical applications and civil engineering applications. In particular, most of epoxy-based "heavy duty paints" used as anticorrosive paints for large-scale steel structures require operations under natural drying and curing conditions.

In these fields, steel materials may be coated and then assembled, or they may be assembled and then coated. Methods of coating conforming to the individual process steps are prescribed. Particularly, when the steel materials are large in size and irregular in shape and are not produced in large quantities in the same size and shape, there is no way, for economic reasons, but to utilize the natural phenomena directly as drying and curing conditions after coating. The same can be said with regard to paints or adhesives for steel pipes, bridges, largesized vehicles, aircraft, buildings, and roads.

Most of epoxy resins to be utilized by curing under natural drying and curing conditions are combined with amine-type curing agents. The greatest defect of a composition composed of an epoxy resin and an amine-type curing agent, however, is poor low-temperature curability, and in some cases, the composition does not at all cure at low temperatures.

Attempts have been made to solve the problem of low-temperature curability by, for example, using (1) a curing accelerator, (2) a thiokol-type curing agent which can react even at low temperatures, (3) an ester-type epoxy resin, (4) an epoxy-urethane system, or (5) a novolak-type epoxy resin. Such methods have been used by utilizing their respective advantages, but have the following defects.

According to the method (1), a catalyst which catalyzes the ring-opening reaction of epoxy groups and an amino or imino group, such as a tertiary amine, a phenolic compound or an acidic compound, is used as the curing accelerator. This method is available only at temperatures of 20° C. at the lowest. It has the defect that the accelerator acts as a deleterious factor on the various properties of the cured product and that when the temperature goes down to 5° C. or to a point below the freezing point, the effect is not observed, and the accelerator itself remains in the cured product.

The curing agent in the method (2) basically utilizes the reaction of an epoxy group with a mercapto group. By using it properly in combination with the curing accelerator in (1), the resulting composition shows excellent curability such that it rapidly cures even at temperatures below the freezing point. On the other hand, the use of this curing agent leads to a loss of many properties expected of an epoxy resin, such as adhesive properties and chemical resistance. Hence, this method is of little practical value, too.

The ester-type epoxy resin in the method (3) readily reacts with the amino group at low temperatures. If it is used in combination with a suitable curing accelerator, a great improvement in low-temperature curability can be expected. Since, however, many ester linkages exist in the cured product as a result of using this method, the inherent properties of the epoxy resin such as water resistance and alkali resistance will be degraded.

According to the method (4), the epoxy resin is cured by an isocyanate curing agent by utilizing the hydroxyl groups therein (or increased hydroxyl groups obtained by modifying the resin further) while retaining the unique structure of the epoxy resin. This method is actually used for curing epoxy resins at low temperatures. But the epoxy resin is liable to foam and generate gas during curing at high humidity. Furthermore, as a result of the decrease of the hydroxyl groups in the cured product, its adhesive properties are degraded and its corrosion resistance during long-term use becomes poor. Furthermore, top coating must be performed at short intervals. Thus, the cured product is very defective in respect of properties other than low-temperature curability as compared with general-purpose room temperature curable epoxy-amine systems.

The method (5) contemplates the use of a novolak-type epoxy resin obtained by reacting a novolak resin prepared from phenol or cresol and formaldehyde, with epichlorohydrin. A composition comprising this epoxy resin and a curing agent has excellent low-temperature curability and improved heat resistance, but suffers from the defect that its adhesion to an iron surface or to the surfaces of other materials is poor and it is immiscible with polyamide-type curing agents.

Under these circumstances, it has been strongly desired to develop an epoxy resin which retains and improves the inherent properties of a composition composed of a bisphenol A-type epoxy resin and a curing agent therefor and excellent low-temperature curability. Such a resin would give a good solution to the problem of shortening the drying time as compared with conventional resin compositions not only at low temperatures but also under relatively mild climatic conditions, namely at higher temperatures, and would further be able to decrease the drying temperature and time at still higher temperatures under oven-drying curing conditions.

As an epoxy resin which can meet the above earnest desire held over years, the present invention provides an epoxy resin composition having excellent handling properties, solvent resistance, corrosion resistance and heat resistance and particularly excellent low-temperature curability, said composition comprising (A) a polyfunctional epoxy resin (A) having an epoxy equivalent of 160 to 2,000 obtained by reacting (a-1) an epoxy resin having an epoxy equivalent of 100 to 800 with (a-2) a molecular weight increasing agent containing 2.1 to 10 functional groups (phenolic hydroxyl groups) on an average per molecule and (B) a curing agent for the epoxy resin as essential ingredients. More specifically, this invention provides a resin composition comprising (A) a polyfunctional epoxy resin obtained by using a novolak resin derived from a phenol compound, a novolak resin derived from a diphenol compound or a xylene resin modified with phenol, a substituted phenol or a novolak resin, and (B) a curing agent for the epoxy resin as essential components.

In the present invention, the polyfunctional epoxy resin (A) denotes a resin having an epoxy equivalent of 160 to 2,000 and a molecular weight of 200 to 6,000, preferably an epoxy equivalent of 180 to 1,800 and a molecular weight of 250 to 5,000, more preferably an epoxy equivalent of 185 to 1,500 and a molecular weight of 250 to 4,000. The resin is obtained by reacting (a-1) an epoxy resin having an epoxy equivalent of 100 to 800 and a molecular weight of 200 to 2,000, preferably an epoxy equivalent of 160 to 700 and a molecular weight of 250 to 1,800 and containing about 2 glycidyl ether groups derived from a diphenol compound having difunctional phenolic hydroxyl groups per molecule typified by bisphenol A or bisphenol F with (a-2) a molecular weight increasing agent containing 2.1 to 10 functional groups on an average per molecule and having a molecular weight of 200 to 2,000, which is a polyhydric phenol having 2.1 to 10, preferably 2.3 to 6, phenolic hydroxyl groups per molecule, in such proportions that the number of the phenolic hydroxyl groups in the molecular weight increasing agent (a-2) is less than 1, preferably 0.05 to 0.8, per epoxy group in the epoxy resin (a-1) and the resulting polyfunctional epoxy resin (A) does not gel.

The diphenol compound denotes all compounds having about 2 phenolic hydroxyl groups per molecule and includes, for example, compounds represented by the general formula

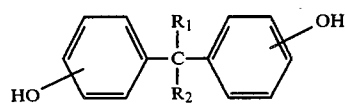

wherein each of $R_1$ and $R_2$ represents a hydrogen atom or an alkyl or alkenyl group, such as bisphenol A, bisphenol F or isomers thereof; hydroxyphenylalkanes resulting from substitution of the benzene ring in general formula [I] by a halogen atom such as chlorine or bromine or an alkyl group; dihydroxybenzenes represented by the general formula

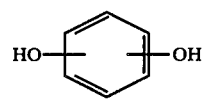

and their nuclearly alkylated or halogenated products.

The diglycidyl ether-type epoxy resin (a-1) having about 2 glycidyl ether groups per molecule is obtained by a known method from the diphenol compound and an epoxy group-introducing substance such as epichlorohydrin, epibromohydrin or methylepichlorohydrin. An epoxy resin (called DGEBPA) obtained by using bisphenol A (BPA) as the diphenol compound is most general.

Firstly, the molecular weight increasing agent (a-2) includes, for example, a so-called novolak resin represented by the following general formula

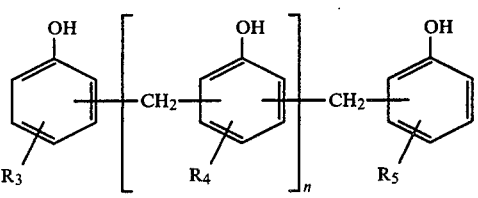

wherein each of $R_3$, $R_4$ and $R_5$ represents a hydrogen atom or an alkyl group such as methyl, ethyl, n-butyl, t-butyl, octyl or nonyl or an alkenyl group, and n is a rational number of 0.1 to 8, which is obtained from a monophenol compound such as phenol or an alkylphenol and formaldehyde, or a diphenol compound and formaldehyde. Secondly, there may be cited a modified phenolic resin obtained by modifying a xylene-aldehyde resin with phenol, a substituted phenol or a novolak resin. These resins should contain 2.1 to 10 functional groups on an average per molecule.

The novolak resin of general formula [III] is usually obtained as a mixture of compounds of this formula in which n is 0, 1, 2, 3, .... The rational number n of 0.1 to 8 in general formula [III] means an average value of the mixture.

The proportions of the diglycidyl ether-type epoxy resin (a-1) and the molecular weight increasing agent (a-2) used in preparing the polyfunctional epoxy resin (A) are never arbitrary, but should be such that not more than 1, preferably 0.05 to 0.8, phenolic hydroxyl group in (a-2) is used per epoxy group in the resin (a-1). In addition, since the limitation of the proportions of the compounds (a-1) and (a-2) is set on the basis of the number n in general formula [III] and the phenolic hydroxyl groups present in the molecule, the proportions should be within the range in which gellation does not occur.

The polyfunctional epoxy resin (A) is obtained by reacting the epoxy resin (a-1) with the molecular weight increasing agent (a-2) in the limited proportions described above in the presence of a known conventional catalyst such as sodium hydroxide or a tertiary amine and heating the mixture to react the epoxy groups of the epoxy resin (a-1) with the phenolic hydroxyl groups of the molecular weight increasing agent (a-2).

The low-temperature curability of the resulting epoxy resin depends upon the number of the functional groups of the polyfunctional epoxy resin (A) so obtained, and therefore, the combination of the epoxy resin (a-1) and the molecular weight increasing agent (a-2) is the most important factor. Specifically, by causing the number of the functional groups of the polyfunctional epoxy resin (A) to infinitely approach 2, the factor of low-temperature curability is infinitely decreased.

On the basis of this information, the "polyfunctional" as used in this invention denotes at least 2.1 functional groups on an average, and not more than 10 functional groups on an average in view of workability, in order to obtain practical low-temperature curability which meets the object of this invention.

The curing agent for the epoxy resin (B) denotes a substance which reacts with the polyfunctional epoxy resin (A) to dry and cure it. In natural room temperature curing, known conventional amine-type curing agents, i.e. amino group (or imino group)-containing compounds typified by polyamines, or their derivatives can be used as the curing agent for the epoxy resin (B). Typical examples include aliphatic amines such as triethylenetetramine; aromatic amines such as diaminodiphenylmethane; alicyclic amines such as "Laromin-260" [bis(4-amino-3-methyl-cyclohexyl)-methane manufactured by BASF, West Germany]; amine compounds such as isophoronediamine or xylylenediamine; amide compounds or polyamideamine compounds obtained from such amine compounds and fatty acids or dimeric fatty acids; and amide-adduct amine compounds or amine-adduct compounds which are preliminary co-condensation products of amine compounds and epoxy resins. When curing the polyfunctional epoxy resin by the oven drying-type curing method which is carried out by means of external physical factors such as heat and pressure, there can also be used amines whose reaction with the epoxy groups is slow at room temperature, such as dicyandiamide, modified dicyandiamides or adipic acid dihydrazide; acid anhydrides such as phthalic anhydride, tetrahydrophthalic anhydride, hexahydrophthalic anhydride and alkylated products thereof, trimellitic anhydride and pyromellitic anhydride; resol-type or novolak-type phenolic resins; and acid-excess polyesters or melamine resins as the curing agent (B), in addition to the above amine-type curing agents.

By using the polyfunctional epoxy resin (A) and the curing agent (B) as essential ingredients, the required properties such as handling properties, hardness, water resistance, solvent resistance and corrosion resistance can be obtained early in natural room temperature curing and drying. In particular, since the dryability of the resin in the winter time or in cold districts is good, the range of application of the epoxy resin composition can be widened greatly. Since in oven drying and curing, the required strength can be obtained by the use of less energy, saving of energy can be realized to minimize the use of limited resources. In addition, other advantages such as the shortening of the curing cycle or the mold releasing time can be obtained.

As required, the compositions of this invention may include organic compounds such as curing accelerators, solvents, diluents, bitumens and petroleum resins and inorganic substances such as glasses, carbons, pigments (e.g., titanium oxide, talc and silica) or fibers.

The following Referential Examples, Examples and Comparative Examples illustrate the present invention in greater detail. All parts and percentages are by weight unless otherwise indicated.

The epoxy equivalents given hereinafter were measured for solid matter.

REFERENTIAL EXAMPLES 1 TO 4

Preparation of polyhydric phenols as the molecular weight increasing agent (a-2):

In each run, the monophenol compound and 37% formalin shown in Table 1 were used in the amounts indicated and reacted at 80° C. for 4 hours in the presence of 0.3 g of hydrochloric acid. The reaction mixture was then neutralized to a pH of 7.5 by using a 10% aqueous solution of sodium hydroxide. The excess of the monophenol compound was distilled off with steam until it was no longer substantially detected.

Thus, the various novolak resin having the properties shown in Table 1 were obtained.

TABLE 1

|  | Referential Example 1 | Referential Example 2 | Referential Example 3 | Referential Example 4 |
| --- | --- | --- | --- | --- |
| Monophenol compound | o-Cresol 108 g | Phenol 90 g | Phenol 90 g | Phenol 90 g |
| 37% Formalin | 40.5 g | 40.5 g | 32.4 g | 52.7 g |
| Melting point (°C.) | 76 | 73 | 68 | 78 |
| Average number of functional groups | 3.5 | 3.5 | 2.7 | 4.5 |
| Designation of the polyhydric phenol | a-2-1 | a-2-2 | a-2-3 | a-2-4 |

REFERENTIAL EXAMPLE 5

Preparation of a polyfunctional epoxy resin (A):

A 1-liter four-necked flask equipped with a stirrer, a nitrogen introducing tube, a thermometer and a condenser was charged with 190 g of "EPICLON 850" (an epoxy resin having an epoxy equivalent of 190 obtained from bisphenol A and epichlorohydrin, a product of Dainippon Ink and Chemicals, Inc.) and 22.1 g of the phenol resin (a-2-1) (namely in such proportions that the number of phenolic hydroxyl groups was 0.18 per epoxy group). Then, 0.4 g of a 1% aqueous solution of sodium hydroxide was added, and the charged materials were reacted at 140° C. for 5 hours. Methyl isobutyl ketone (90.9 g) was added to obtain the desired resin (A). The product was a resin solution having a nonvolatile content of 70%, and the resin had an epoxy equivalent of 260. It is abbreviated as the resin (A-1).

REFERENTIAL EXAMPLE 6

Preparation of a polyfunctional epoxy resin (A):

In the same way as in Referential Example 5, 170 g of "EPICLON 830" (an epoxy resin having an epoxy equivalent of 170 obtained from bisphenol F and epichlorohydrin, a product of the aforesaid company) and 22.1 g of the phenol resin (a-2-2) were used (namely in such proportions that the number of phenolic hydroxyl groups was 0.21 per epoxy group). Furthermore, 0.4 g of a 1% aqueous solution of sodium hydroxide was added, and the charged materials were reacted at 140° C. for 4 hours. Then, 82.3 g of methyl isobutyl ketone was added to obtain the desired resin (A). The product was a resin solution having a non-volatile content of 69.8%, and the resin had an epoxy equivalent of 243. It is abbreviated as the resin (A-2).

REFERENTIAL EXAMPLE 7

Preparation of a polyfunctional epoxy resin (A):

A solution having a nonvolatile content of 70.5% of the desired resin (A) having an epoxy equivalent of 300 was prepared by the same method as in Referential Example 6 except that 33.7 g of the phenol resin (a-2-3) was used instead of the polyhydric phenol (a-2-2) (namely in such proportions that the number of phenolic hydroxyl groups was 0.21 per epoxy group), and the amount of methyl isobutyl ketone was changed to 87.3 g. It is abbreviated as the resin (A-3).

REFERENTIAL EXAMPLE 8

A solution having a nonvolatile content of 70.8% of the desired resin (A) having an epoxy equivalent of 238 was prepared in the same way as in Referential Example 7 except that the same amount of the phenol resin (a-2-4) was used instead of the polyhydric phenol (a-2-3) (namely in such proportions that the number of the phenolic hydroxyl groups was 0.21 per epoxy group). It is abbreviated as the resin (A-4).

REFERENTIAL EXAMPLE 9

Preparation of a polyfunctional epoxy resin (A):

In the same way as in Referential Example 5, 260 g of "EPICLON 860" (an epoxy resin having an epoxy equivalent of 260 obtained from bisphenol A and epichlorohydrin, a product of the aforesaid company) and 41.4 g of the phenol resin (a-2-1) were charged (namely in such proportions that the number of phenolic hydroxyl groups was 0.35 per epoxy group), and reacted at 160° C. for 5 hours the presence of 0.6 g of a 1% aqueous solution of sodium hydroxide. Then, 100.5 g of methyl isobutyl ketone and 100.3 g of xylene were added to obtain a solution having a non-volatile content of 60.5% of the desired resin (A) having an epoxy equivalent of 465. It is abbreviated as the resin (A-5).

REFERENTIAL EXAMPLE 10

Preparation of a polyfunctional epoxy resin (A):

A solution having a non-volatile content of 59.8% of the desired resin (A) having an epoxy equivalent of 470 was prepared in the same way as in Referential Example 9 except that the same amount of the phenol resin (a-2-2) was used instead of the polyhydric phenol (a-2-1) (namely in such proportions that the number of phenolic hydroxyl groups was 0.39 per epoxy resin). The product is abbreviated as the resin (A-6).

REFERENTIAL EXAMPLE 11

Preparation of an amino group-containing compound as a curing agent (B):

A four-necked flask equipped with a stirrer, a nitrogen introducing device, a dropping funnel and a thermometer was charged with 100 g of triethylenetetramine. While the inside of the flask was purged with nitrogen gas, the temperature was raised to 80° C. When this temperature was reached, 75 g of "EPICLON 1050-75X" (an epoxy resin having an epoxy equivalent of 475, 75% xylene solution, a product of Dainippon Ink and Chemicals, Inc.) was added dropwise over 2 hours. The temperature was further raised to 100° C., and the mixture was further stirred for 2 hours. The reaction mixture was distilled under reduced pressure to remove the remaining triethylenetetramine. Then, 53.8 g of toluene and 53.8 g of n-butanol were added to obtain a solution of the desired compound having an amine value of 380 and an active hydrogen equivalent of 125.

EXAMPLES 1 TO 18 AND COMPARATIVE EXAMPLES 1 TO 6

Resin compositions of this invention and control resin compositions were prepared by using the polyfunctional epoxy resins (A) obtained in Referential Examples 5 to 10 and the amino group-containing compound obtained in Referential Example 11 in the mixing proportions (solids weight proportions) shown in Tables 2 to 4 and mixing them with stirring in a customary manner.

In the preparation of the control resin compositions, commercially available "EPICLON 860" and "EPICLON 1050" (epichlorohydrin bisphenol A-type epoxy resins having an epoxy equivalent of 475, products of the aforesaid company) were used instead of the polyfunctional epoxy resin (A).

Coated films were formed from these resin compositions by the following procedures, and their mechanical properties, corrosion resistance and low-temperature curability were evaluated. The results are summarized in Tables 2 to 4.

(1) Coating substrate

A cold rolled steel plate (0.8×70×150 mm) stipulated in JIS G-3141 which was cleaned by the method stipulated in JIS K-5400-1970, 3.3: (3).

(2) Coating method

Each of the coating resin compositions was coated on the above substrate by the method of JIS K-5400-1970, 3.5: (1) so that the thickness of the coated film after drying was 100±3 micrometers in a clear film test (namely, a test on coatings which do not contain any pigment; Table 2), and 300±20 micrometers in an enamel film test (see Table 3) and a tar enamel film test (see Table 4) (namely, tests on coatings which contain a pigment).

(3) Drying of the coated film

The coated film was dried for 7 days in a constant temperature chamber kept at 25° C. Only when coated films were prepared for a low-temperature curability test and a walkable test, the coated films were dried in a constant temperature chamber at 5° C. immediately after coating.

(4) Testing methods and evaluation (4-1) Moisture resistance test and salt spray test These tests were performed in a customary manner using a conventional moisture resistance tester and a conventional salt spray tester, and the degree of change in the coated film after each test as compared with that before the test was visually observed and evaluated.

(4-2) Crosshatch adhesion test (crosscut test)

By providing 11 cuts longitudinally and laterally at intervals of 1 mm on the coated film by means of a razor edge, 100 square sections were made. A cellophane tape was bonded to the cut portions and strongly peeled off.

(4-3) Pencil hardness

Evaluated after drying at 25° C. for 24 hours in accordance with JIS K-5401 (1969).

(4-4) Low-temperature curability

Evaluated after leaving the coated film to stand at 5° C. for 16 hours in accordance with JIS K-5400-1970, 5, 10: (2) (b).

(4-5) Walkable test on plate after 16 hour drying

The coated film was dried at 5° C. for 16 hours, and then the coated surface was stamped with shoes (load about 60 kg) to determine whether walking was possible or not.

REFERENTIAL EXAMPLE 12

Preparation of a polyhydric phenol as a molecular weight increasing agent (a-2):

Bisphenol A (228 g) was dissolved in 70 g of hot water, and 12 g of a 20% aqueous solution of oxalic acid was added. The temperature was raised to 100° C., and 41.5% formalin was added dropwise. The mixture was maintained at this temperature for 6 hours. Dehydration was carried out over 3 hours so that finally the temperature reached 180° C. to obtain a bisphenol A-derived

TABLE 2

| | | Example | | | | | | Comparative Example | |
|---|---|---|---|---|---|---|---|---|---|
| | | 1 | 2 | 3 | 4 | 5 | 6 | 1 | 2 |
| Mixing proportions | | | | | | | | | |
| Epoxy resin used | Designation Amount | A-1 | A-2 | A-3 100 | A-4 | A-5 | A-6 | EPICLON 860 | EPICLON 1050 100 |
| Amino group-containing Compound | Amount | 48 | 51 | 42 | 53 | 27 | 27 | 48 | 27 |
| Properties of the coated film | | | | | | | | | |
| Salt spray test | | | | Acceptable | | | | Acceptable | |
| Moisture resistance test | | | | Acceptable | | | | Acceptable | |
| Crosshatch adhesion test | | | | Acceptable | | | | Acceptable | |
| Low-temperature curability | | | | Acceptable | | | | Unacceptable | |
| Walkable test | | | | Acceptable | | | | Unacceptable | |
| Pencil hardness | After 1 day | | | 6B | | | | Softer than 6B | |
| | After 3 days | | | 4B | | | | 6B | Softer than. 6B |
| | After 7 days | | | HB | | | | H | 2B |

TABLE 3

| | | Example | | | | | | Comparative Example | |
|---|---|---|---|---|---|---|---|---|---|
| | | 7 | 8 | 9 | 10 | 11 | 12 | 5 | 6 |
| Mixing proportions | | | | | | | | | |
| Poly-functional epoxy resin | Designation Amount | A-1 | A-2 | A-3 100 | A-4 | A-5 | A-6 | EPICLON 860 | EPICLON 1050 100 |
| Amount of the amino group-containing compound | | 48 | 51 | 42 | 53 | 27 | 27 | 48 | 27 |
| Amount of talc | | 49 | 50 | 47 | 51 | 42 | 42 | 49 | 42 |
| Amount of silica | | 49 | 50 | 47 | 51 | 42 | 42 | 49 | 42 |
| Properties of the coated film | | | | | | | | | |
| Salt spray test | | | | Acceptable | | | | Acceptable | |
| Moisture resistance test | | | | Acceptable | | | | Acceptable | |
| Crosshatch adhesion test | | | | Acceptable | | | | Acceptable | |
| Low-temperature curability | | | | Acceptable | | | | Unacceptable | |
| Walkable test | | | | Acceptable | | | | Unacceptable | |
| Pencil hardness | After 1 day | | | 5B | | | | Softer than 6B | |
| | After 3 days | | | HB | | | | 3B | 4B |
| | After 7 days | | | H | | | | HB | B |

TABLE 4

| | | Example | | | | | | Comparative Example | |
|---|---|---|---|---|---|---|---|---|---|
| | | 13 | 14 | 15 | 16 | 17 | 18 | 5 | 6 |
| Mixing proportions | | | | | | | | | |
| Poly-functional epoxy resin | Designation Amount | A-1 | A-2 | A-3 100 | A-4 | A-5 | A-6 | EPICLON 860 | EPICLON 1050 100 |
| Amount of the amino group-containing compound | | 48 | 51 | 42 | 53 | 27 | 27 | 48 | 27 |
| Amount of tar pitch | | 197 | 201 | 189 | 204 | 169 | 169 | 197 | 169 |
| Amount of talc | | 148 | 151 | 142 | 153 | 127 | 127 | 148 | 127 |
| Properties of the coated film | | | | | | | | | |
| Salt spray test | | | | Acceptable | | | | Acceptable | |
| Moisture resistance test | | | | Acceptable | | | | Acceptable | |
| Crosshatch adhesion test | | | | Acceptable | | | | Acceptable | |
| Low-temperature curability | | | | Acceptable | | | | Unacceptable | |
| Walkable test | | | | Acceptable | | | | Unacceptable | |
| Pencil hardness | After 1 day | | | Softer than 6B | | | | Sticky | |
| | After 3 days | | | 5B | | | | Softer than 6B | Sticky |
| | After 7 days | | | 2B | | | | 5B | Softer than 6B | novolak resin having a melting point of 110° C. and a phenolic hydroxyl group equivalent of 120 and containing 6.0 functional groups on an average. It is abbreviated as the polyhydric phenol (a-2-5).

REFERENTIAL EXAMPLE 13

Preparation of a polyfunctional epoxy resin (A):

A solution having a nonvolatile content of 60.2% of the desired resin (A) having an epoxy equivalent of 320 was prepared in the same way as in Referential Example 10 except that 16.3 g of the polyhydric phenol (a-2-5) was used instead of the polyhydric phenol (a-2-2) (namely in such proportions that the number of phenolic hydroxyl groups was 0.14 per epoxy group). It is abbreviated as the resin (A-7).

REFERENTIAL EXAMPLE 14

Preparation of a polyfunctional epoxy resin (A):

A solution having a nonvolatile content of 59.8% of the desired resin (A) having an epoxy equivalent of 300 was prepared in the same way as in Referential Example 13 except that 15.7 g of "NIKKANOL P-100" (phenol-modified xylene resin having a phenolic hydroxyl group equivalent of 194 and a molecular weight of 800 and containing 4.1 functional groups on an average, a product of Mitsubishi Gas Chemical Company, Inc.) was used instead of the polyhydric phenol (a-2-5) (namely in such proportions that the number of the phenolic hydroxyl groups was 0.08 per epoxy group). It is abbreviated as the resin (A-8).

REFERENTIAL EXAMPLE 15

In the same way as in Referential Example 5, 190 g of "EPICLON 850", 65.5 g of bipshenol A and 0.5 g of a 1% aqueous solution of sodium hydroxide were reacted at 140° C. for 4 hours to obtain an intermediate diglycidyl ether having an epoxy equivalent of 600, and then the polyhydric phenol (a-2-1) as a molecular weight increasing agent was added in such a proportion that the number of the phenolic hydroxyl groups became 0.15 per 0.43 epoxy group. The reaction was carried out at 160° C. for 7 hours. Then, 90.4 g of methyl isobutyl ketone and 90.4 g of xylene were added to obtain a solution having a nonvolatile content of 59.6% of the resin (A) having an epoxy equivalent of 980. It was abbreviated as the resin (A-9).

EXAMPLES 19 TO 21 AND COMPARATIVE EXAMPLES 7 TO 9

Each of various resin compositions obtained by using "EPICLON B-570" (an alicyclic acid anhydride produced by Dainippon Ink and Chemicals, Inc.) and "EPICLON B-4400" (an alicyclic tetrabasic acid anhydride produced by the same company) in the mixing proportions (solid weight proportions) shown in Table 5 was impregnated in a glass braid. The solvent was then volatilized, and the relative rigidity and the logarithmic decay rate were measured by using a torsion braid analytical device. Thus, the glass transition point (Tg), which is an important factor representing heat resistance, of the resin was determined. The results are summarized in Table 5.

TABLE 5

|  |  | Example | | | Comparative Example | | |
|---|---|---|---|---|---|---|---|
|  |  | 19 | 20 | 21 | 7 | 8 | 9 |
| Mixing proportions | | | | | | | |
| Epoxy resin | Designation | | A-5 | | | EPICLON 1050 | |
|  | Amount | | 100 | | | 100 | |
| Curing agent | Type | EPICLON B-570 | EPICLON B-570 | EPICLON B-4400 | EPICLON B-570 | EPICLON B-570 | EPICLON B-4400 |
|  | Amount | 33 | 33 | 25 | 33 | 33 | 25 |
| Dimethyl-benzylamine | Amount* | | 1 | | | 1 | |
| Curing conditions | Temp. (°C.) | 100 | 150 | 180 | 100 | 150 | 180 |
|  | Time (hrs.) | 1 | 2 | 2 | 1 | 2 | 2 |
| Tg (°C.) | | 66 | 75 | 220 | 59 | 66 | 195 |

*PHR: per hundred parts of the epoxy resins

It is clearly seen from the results shown in Table 5 that the compositions of this invention have excellent heat resistance, and a comparison of Example 19 with Comparative Example 8 shows that in obtaining a cured product having a Tg of 66° C., the heat curing temperature and time can be decreased to half in the present invention.

The results demonstrate the effectiveness of the composition of this invention in applications requiring heat resistance, such as laminated boards.

EXAMPLES 22 TO 30

In the same way as in Examples 1 to 18 and Comparative Examples 1 to 6, resin compositions were obtained, and coated films were formed from them and evaluated. The results are summarized in Table 6.

Examples 22 to 24 show clear paints; Examples 25 to 27, enamels; and Examples 28 to 30, tar epoxy paints.

TABLE 6

|  |  | Example | | | | | | | | |
|---|---|---|---|---|---|---|---|---|---|---|
|  |  | 22 | 23 | 24 | 25 | 26 | 27 | 28 | 29 | 30 |
| Mixing proportions | | | | | | | | | | |
| Epoxy resin | Designation | A-7 | A-8 | A-9 | A-7 | A-8 | A-9 | A-7 | A-8 | A-9 |
|  | Amount | | 100 | | | 100 | | | 100 | |
| Amount of the amino group-containing compound | | 39 | 42 | 13 | 39 | 42 | 13 | 39 | 42 | 13 |
| Amount of silica | | | | | 46 | 47 | 38 | | | |
| Amount of talc | | | | | 46 | 47 | 38 | 139 | 142 | 113 |
| Amount of tar pitch | | | | | | | | 85 | 189 | 51 |
| Properties of the coated film | | | | | | | | | | |
| Salt spray test | | Acceptable | | | Acceptable | | | Acceptable | | |

TABLE 6-continued

|  | | Example | | | | | | | | |
|---|---|---|---|---|---|---|---|---|---|---|
|  | | 22 | 23 | 24 | 25 | 26 | 27 | 28 | 29 | 30 |
| Moisture resistance test | | Acceptable | | | Acceptable | | | Acceptable | | |
| Crosshatch adhesion test | | Acceptable | | | Acceptable | | | Acceptable | | |
| Low-temperature curability | | Acceptable | | | Acceptable | | | Acceptable | | |
| Walkable test on plate after 16 hour drying | | Acceptable | | | Acceptable | | | Acceptable | | |
| Pencil hardness | After 1 day | | 6B | | | 5B | | | Softer than 6B | |
|  | After 3 days | | 4B | | | HB | | | 5B | |
|  | After 7 days | | HB | | | H | | | 2B | |

REFERENTIAL EXAMPLE 16

Preparation of a polyfunctional epoxy resin (A): "EPICLON 850" (190 parts), 23.1 parts of the phenol resin (a-2-2) and 28.5 parts of bisphenol A were charged (namely in such proportions that the number of phenolic hydroxyl groups was 0.47 per epoxy group). Furthermore, 0.7 part of a 1% aqueous solution of sodium hydroxide was added, and the reaction was carried out at 145° C. for 4 hours to give the desired resin (A) having an epoxy equivalent of 470 and a melting point of 80° C. It is abbreviated as the resin (A-10).

REFERENTIAL EXAMPLE 17

Preparation of a polyfunctional epoxy resin (A): "EPICLON 850" (190 parts), 13.9 parts of the phenol resin (a-2-2) and 51.8 parts of bipshenol A were charged (namely in such proportions that the number of phenolic hydroxyl groups per epoxy group was 0.6). Furthermore, 0.7 part of a 1% aqueous solution of sodium hydroxide was added, and the reaction was carried out at 150° C. for 5 hours to give the desired resin (A) having an epoxy equivalent of 660 and a melting point of 95° C. It is abbreviated as the resin (A-11).

REFERENTIAL EXAMPLE 18

Preparation of an epoxy-modified phenolic resin as a curing agent:

"EPICLON 850" (190 parts), 110 parts of the phenol resin (a-2-2), 160 parts of bisphenol A and 2 parts of a 5% aqueous solution of trimethyl ammonium chloride were used and reacted at 170° C. for 7 hours. The epoxy groups no longer existed, and the resulting resin had a melting point of 102° C. and a theoretical active hydrogen equivalent of 315 g/eq. A 40% butyl carbitol solution of this resin had a Gardner viscosity at 25° C. of U-V.

EXAMPLES 31 TO 33 AND COMPARATIVE EXAMPLES 10 TO 12

The polyfunctional epoxy resins (A) obtained in Referential Examples 16 and 17 and/or commercially available epoxy resins under trade names "EPICLON 4050" (bisphenol A-type epoxy resin made by Dainippon Ink and Chemicals, Inc.), "EPICLON N-740" (phenol novolak type epoxy resin made by the same company) and "EPICLON N-775" (ditto), the epoxy-modified phenolic resin (curing agent) obtained in Referential Example 18, "Modaflow" (a flow controlling agent made by Monsanto Co.), titanium white, silica, carbon black, and "CUREZOL $C_{17}Z$" (an alkylimidazole-type compound made by Shikoku Chemicals, Corp.) as a curing accelerator were mixed in the mixing proportions shown in Table 7. The mixtures were each coarsely pulverized, kneaded, finely pulverized and classified in a customary manner to obtain various powder paints.

Each of the powdery paints was coated on a sand blast treated steel plate to a film thickness of 200 micrometers a customary manner, and then cured under the curing conditions shown in Table 7.

The properties of the cured films were evaluated, and the results are summarized in Table 7.

TABLE 7

|  |  | Example | | | Comparative Example | | |
|---|---|---|---|---|---|---|---|
|  |  | 31 | 32 | 33 | 10 | 11 | 12 |
| Mixing proportions | | | | | | | |
| Polyfunctional epoxy resin | Designation | A-10 | A-10 | A-11 | | | |
|  | Amount | 9.3 | 21.7 | 44 | | | |
| Amount of EPICLON 4050 | | 37.2 | 21.6 | | 50 | 35 | 35 |
| Amount of EPICLON N-740 | | | | | | 8 | |
| Amount of EPICLON N-775 | | | | | | | 8 |
| Amount of the epoxy-modified phenolic resin (curing agent) | | 18.5 | 21.7 | 21 | 15 | 22 | 22 |
| Amount of CUREZOL $C_{17}Z$ | | 0.5 | 0.5 | 0.4 | 0.65 | 0.5 | 0.4 |
| Amount of Modaflow | | | 0.15 | | | 0.15 | |
| Amount of titanium white | | | 10 | | | 10 | |
| Amount of silica | | | 25 | | | 25 | |
| Amount of carbon black | | | 0.05 | | | 0.05 | |
| Curing conditions | | 200° C. × 20 min. | 200° C. × 20 min. | 180° C. × 20 min. | 200° C. × 20 min. | | |
| Properties of the coated film | | | | | | | |
| Gel time (170° C.) | | 50 sec. | 40 sec. | 35 sec. | 60 sec. | 50 sec. | 40 sec. |
| Pencil hardness | | 2H | 2H | 3H | H | 2H | 2H |
| Impact strength (kg × cm) | | 1 × 50 | 1 × 50 | 1 × 40 | 1 × 50 | 1 × 20 | 1 × 10 |
| Erichsen (cm) | | 6 | 6 | 5 | 6 | 4 | 2 |
| Crosshatch adhesion test | | | 100/100 | | 100/100 | 80/100 | 50/100 |
| 60° C. hot water im- | one month | | Acceptable | | Acceptable | Acceptable | Unacceptable |
|  | Crosscuts | | Acceptable | | Acceptable | Unacceptable | Unacceptable |

TABLE 7-continued

| | Example | | | Comparative Example | | |
|---|---|---|---|---|---|---|
| | 31 | 32 | 33 | 10 | 11 | 12 |
| mersing test were provided; 3 months | | | | | | |
| Methyl ethyl ketone rubbing test | | Acceptable | | Unacceptable | Acceptable | Acceptable |

The results shown in the above Examples demonstrate the excellent low-temperatrure curability and also other excellent properties including corrosion resistance of the compositions of this invention.

What is claimed is:

1. An epoxy resin composition having excellent handling properties, solvent resistance and heat resistance and particularly excellent low-temperature curability, said composition comprising (A) a polyfunctional epoxy resin having an epoxy equivalent of 180 to 1,800 obtained by reacted (a-1) an epoxy resin having an epoxy equivalent of 160 to 700 and containing about 2 glycidyl ether groups derived from a diphenol compound with (a-2) a molecular weight increasing agent containing 2.1 to 10 on an average per molecule, and which is selected from the group consisting of novolak resins and modified phenolic resins, in such proportions that the number of phenolic hydroxyl group in the molecular weight increasing agent (a-2) is 0.05 to 0.8 per epoxy group in the epoxy resin (a-1) and (B) a curing agent for the epoxy resin as essential ingredients.

2. The epoxy resin composition of claim 1 wherein the molecular weight increasing agent (a-2) is a novolak resin obtained from phenol and/or a substituted phenol and formaldehyde.

3. The epoxy resin composition of claim 1 wherein the molecular weight increasing agent (a-2) is a novolak resin obtained from a diphenol compound and formaldehyde.

4. The epoxy resin composition of claim 1 wherein the molecular weight increasing agent (a-2) is a resin obtained by modifying a xylene-aldehyde resin with phenol, a substituted phenol or a novolak resin.

5. The epoxy resin composition of claim 1 wherein the polyfunctional epoxy resin (A) has a molecular weight of from 250 to 5000.

6. The epoxy resin composition of claim 1 wherein the polyfunctional epoxy resin (A) has an epoxy equivalent of 185 to 1500 and a molecular weight of 250 to 4000.

7. The epoxy resin composition of claim 6 wherein the epoxy resin (a-1) has a molecular weight of from 250 to 1800.

8. The epoxy resin composition of claim 1 wherein the diphenol compound is selected from the group consisting of compounds of the formula (I)

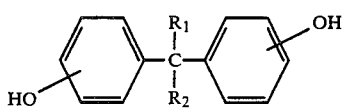

wherein each of $R_1$ and $R_2$ represents a hydrogen atom or an alkyl or alkenyl group, compounds of formula (I) wherein the benzene ring is substituted by a halogen atom or an alkyl group, dihydroxybenzenes represented by the formula (II)

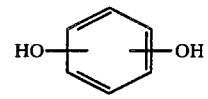

and the nuclearly alkylated or halogenated products of the compounds of formula (II).

9. The epoxy resin composition of claim 8 wherein the epoxy resin (a-1) is obtained by the reaction between the diphenol compound and an epoxy group-introducing substance selected from the group consisting of epichlorohydrin, epibromohydrin and methylepichlorohydrin.

10. The epoxy resin composition of claim 1 wherein the curing agent (B) is an amino group- or imino group-containing compound.

11. The epoxy resin composition of claim 10 wherein the amino group-containing or imino group-containing compound curing agent is a polyamine effective to cure said polyfunctional epoxy resin (A) at room temperature.

12. The epoxy resin composition of claim 11 wherein the polyamine curing agent is selected from the group consisting of triethylenetetraamine, diaminodiphenylmethane, bis(4-amino-3-methyl-cyclohexyl)-methane, isophoronediamine, xylylenediamine, amide or polyamide amine compounds obtained from amine compounds and fatty acids or dimeric fatty acids, and amide-adduct amine compounds or amine-adduct compounds which are preliminarily co-condensation products of amine compounds and epoxy resins.

13. The epoxy resin composition of claim 1 which comprises about 100 parts by weight of the polyfunctional epoxy resin (A) and from about 13 to about 53 parts by weight of the curing agent (B).

14. The epoxy resin composition of claim 13 wherein the curing agent (B) is an amino group-containing compound which is capable of promoting curing of the epoxy resin composition at room temperature.

15. The epoxy resin composition of claim 2, wherein the novolak resin has the following formula

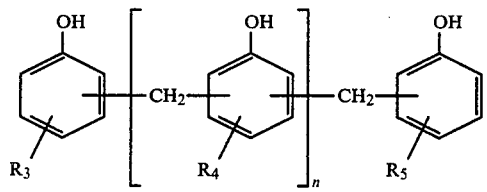

wherein each of $R_3$, $R_4$ and $R_5$ represents a hydrogen atom, alkyl or alkenyl and n is a rational number of 0.1 to 8.

16. The epoxy resin composition of claim 1 wherein the molecular weight increasing agent (a-2) contains 2.3 to 6 phenolic hydroxyl groups on an average per molecule.

* * * * *

UNITED STATES PATENT AND TRADEMARK OFFICE
CERTIFICATE OF CORRECTION

PATENT NO. : 4,611,036

DATED : 9/9/86

INVENTOR(S) : HISASHI SEKUGUCHI ET AL.

It is certified that error appears in the above-identified patent and that said Letters Patent is hereby corrected as shown below:

Claim 1, line 10 of the claim, should read --containing 2.1 to 10 phenolic hydroxyl groups on an average per molecule, and--.

Signed and Sealed this

Twenty-eighth Day of August, 1990

Attest:

HARRY F. MANBECK, JR.

*Attesting Officer*   *Commissioner of Patents and Trademarks*